(No Model.) 2 Sheets—Sheet 2.
A. H. HINKLEY.
FRICTION CLUTCH.
No. 467,686. Patented Jan. 26, 1892.
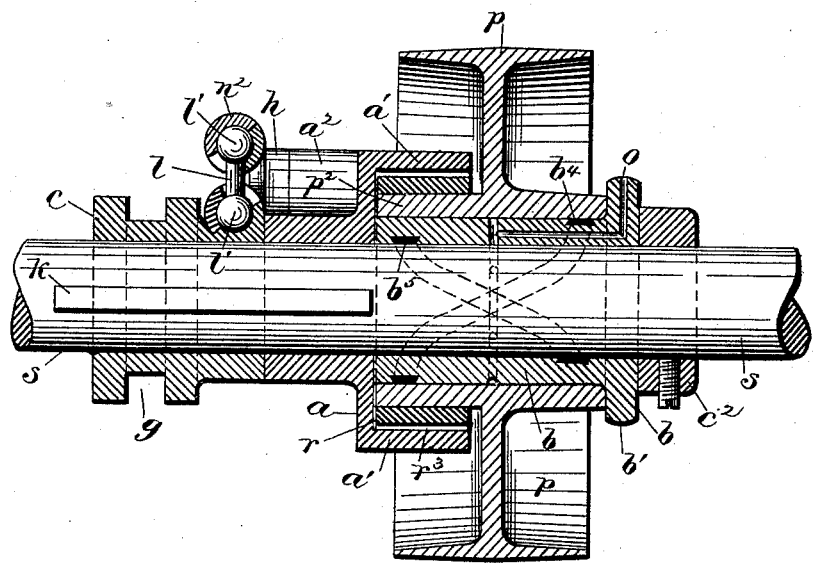
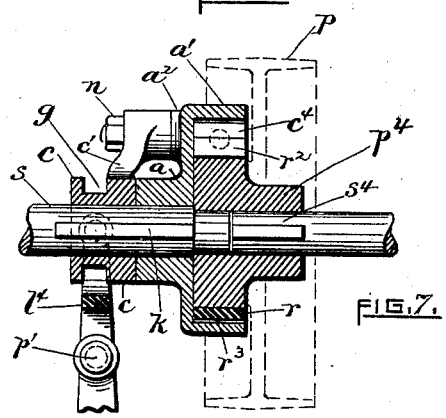
FIG. 6.
FIG. 7.
WITNESSES.
Charles F. Hannigan
H. Francis Tourtellot
INVENTOR.
Adelbert H. Hinkley
by Remington & Henthorn
Attys.

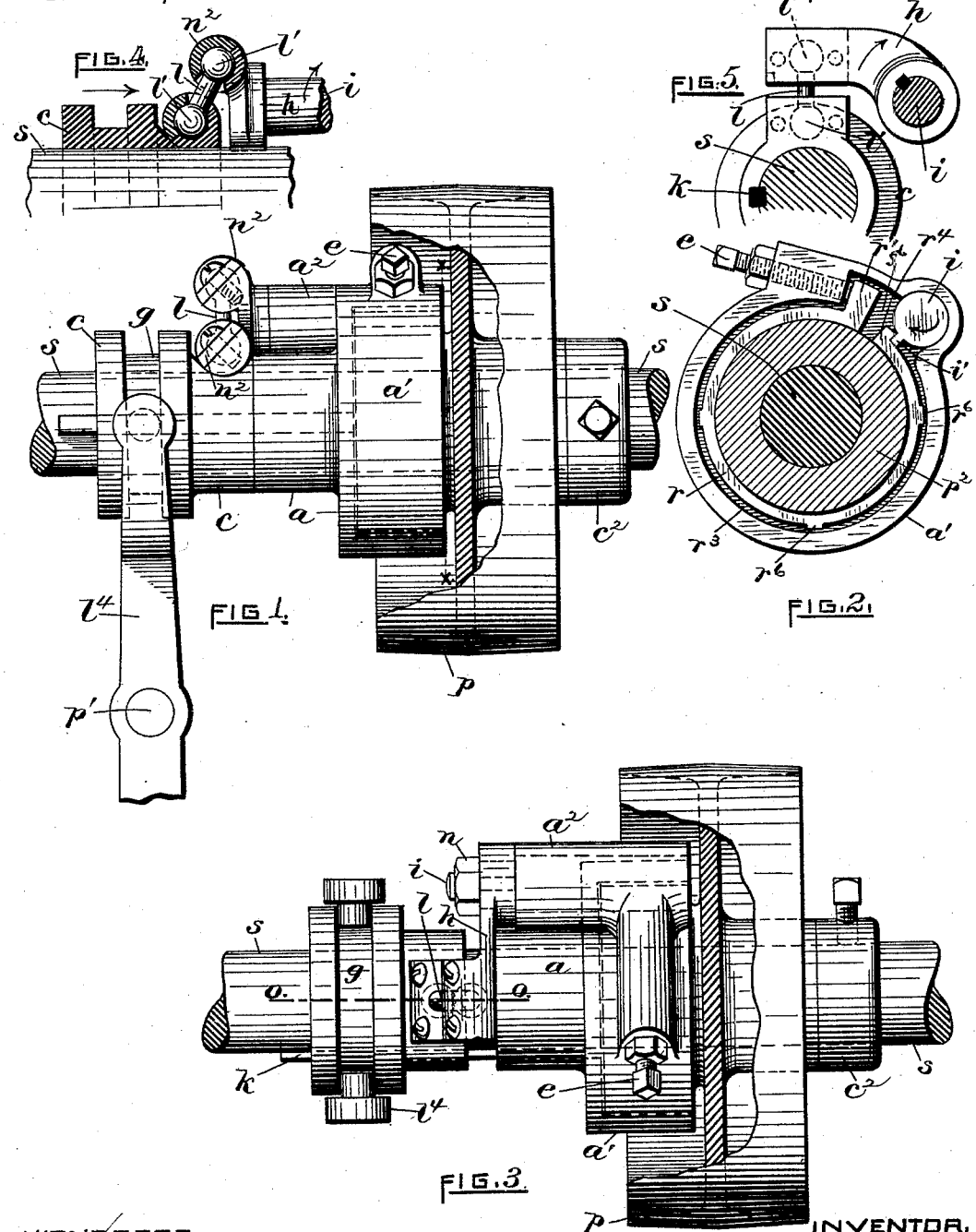

UNITED STATES PATENT OFFICE.

ADELBERT H. HINKLEY, OF PROVIDENCE, RHODE ISLAND, ASSIGNOR TO HENRY BLUNDELL & CO., OF SAME PLACE.

FRICTION-CLUTCH.

SPECIFICATION forming part of Letters Patent No. 467,686, dated January 26, 1892.

Application filed June 6, 1890. Serial No. 354,500. (No model.)

*To all whom it may concern:*

Be it known that I, ADELBERT H. HINKLEY, a citizen of the United States, residing at Providence, in the county of Providence and State of Rhode Island, have invented certain new and useful Improvements in Friction-Clutches; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The improvement forming the subject of my present application for Letters Patent has relation to friction-clutches; and it consists, essentially, in the combination of a driving head or member secured to the power-transmitting shaft, a mounted member or pulley, a laterally-divided friction band or ring mounted in and carried by said driving-head and arranged to frictionally engage the pulley, a longitudinally-guided sliding sleeve arranged to be actuated by a shipper-lever, and a toggle-jointed connection uniting the sleeve and friction-ring, whereby upon forcing the sleeve along the shaft the ring is brought into frictional engagement with the pulley through the medium of the toggle-jointed connection, all as will be more fully hereinafter set forth and claimed.

The object I seek to attain is to simplify the construction of friction-clutches, and at the same time produce one possessing greater efficiency than other clutches of this class.

In order to illustrate my improvement I have prepared the appended two sheets of drawings, in which—

Figure 1, Sheet 1, is a side elevation, a portion of the pulley being broken away, showing the manner of arranging and connecting the toggle so as to actuate the friction-ring. Fig. 2 is a sectional view taken on line $x\ x$ of Fig. 1, the parts being "in clutch." Fig. 3 is a plan view, a portion of the pulley being omitted, showing the shipper-sleeve withdrawn. Fig. 4 is a partial sectional view taken on line $o\ o$, Fig. 3. Fig. 5 is a transverse sectional view showing the inner end of the shipper-sleeve and the toggle-connected operating-lever which contracts or actuates the friction-ring. Fig. 6, Sheet 2, is a longitudinal central sectional view of my improved friction-clutch, showing the pulley mounted to revolve on a sleeve which is loosely mounted on the driving-shaft; and Fig. 7 shows the device arranged as a clutch-coupling.

A more detailed description of my invention and the manner of its operation is as follows:

$s$, referring to the drawings, indicates a driving-shaft adapted to be mounted and operated as common.

$p$ designates a loosely-mounted pulley, from which, by means of a belt, power may be transmitted. The hub or one side of the hub portion $p^2$ is turned off true to receive the friction-ring $r$. In pulleys of large size I prefer to provide the arms with an intermediate lateral rim extending from one side to engage the ring $r$ in lieu of adapting the hub $p^2$ to the ring.

$r$ designates the slightly flexible or yielding friction-ring, turned out to engage and encircle the pulley-hub. The ring is made preferably of cast-iron and is rectangular in cross-section. The ring is divided or cut transversely, the adjacent ends being enlarged (see Fig. 2) and separated by a space $s^6$. The fixed end $r'$ of the ring $r$ is represented as extending into a covered recess or pocket formed in the rim $a'$ of the driving-head $a$. The said end $r'$ of the ring bears against an adjusting-screw $e$, mounted in the head. The other or free end of the ring is also enlarged, the same being upturned, as at $r^4$. The driving-head or fixed member $a$ is secured to the main shaft $s$, and is provided at its front end with an enlarged rim $a'$, which extends into the pulley $p$ and incloses the said hub portion $p^2$ and friction-ring. The inner diameter of the rim $a'$ exceeds the outer diameter of the ring $r$, thereby forming a small concentric space $r^3$ between the adjacent surfaces, as shown.

$c$ indicates a sleeve mounted and arranged to slide longitudinally upon a key fitted into the main shaft, such movement being effected by means of a shipper or clutch lever $l^4$, mounted on a pivot $p'$ and having the lever provided with a U-shaped head portion arranged to engage a groove $g$, formed in the sleeve's hub, substantially as common. On the inner end portion of the sleeve $c$ is mounted one end of a link or toggle connection $l$, Fig. 4, &c., the opposite end $l'$ of the link being mounted in and connected to the free end of a bent arm or lever $h$, which in turn is secured to the outer end of a short shaft $i$, mounted to vibrate axially in a bearing $a^2$, formed on the driving-head $a$ and parallel with the main shaft $s$. The inner or opposite end of the shaft $i$ extends into and is supported by the enlarged portion of the rim $a'$ of the driving-head. The last-named portion of the shaft $i$ is provided with a short tongue or projection $i'$ contiguous to and in contact with the lip or enlargement $r^4$ of the ring. (See Fig. 2.) Now by moving the revolving sleeve $c$ in the arrow direction, Fig. 4, the tendency is to force the link $l$ to a vertical position, thereby vibrating the connected lever $h$ in the arrow direction (see Fig. 5) and causing the shaft $i$ to move axially in unison with it, thus contracting the ring $r$ snugly around the hub of the pulley and causing all the parts to then revolve in unison. A reversal of the operation causes the shaft $i$ to move in the opposite direction from that shown in Fig. 2, when the ring immediately expands by its elasticity and releases itself from the pulley's hub. I sometimes mount the loose pulley $p$ on a sleeve or bushing $b$, which in turn is loosely mounted upon the driving-shaft. This sleeve is provided with a flange $b'$, which bears against the outer face of the pulley-hub. A collar $c^2$, adjustably secured to the main shaft, serves to maintain the sleeve in position upon the shaft. The bore of the sleeve is provided with anti-friction metal $b^5$, arranged in a spiral manner to engage the shaft's surface. In like manner the outer surface of the sleeve is provided with anti-friction metal $b^4$, upon which the pulley itself bears and is adapted to revolve. By means of oil holes or ducts $o$, formed in the sleeve $b$, oil is introduced to the bearing-surfaces. (See Fig. 6.)

I would state that the manner of transmitting power through the clutch may be reversed—that is, instead of mounting the pulley $p$ and driving-head upon the main or driving-shaft, the power may be transmitted to the clutch-pulley by means of a belt leading to it from a driving-pulley mounted upon the driving-shaft, the friction-clutch in such case being mounted upon the receiving-shaft or machine adapted to be intermittingly operated. Such reversal of the manner of operation does not, however, necessarily involve any change in the construction and arrangement of the several parts.

My improved clutch may be readily and advantageously employed as a cut-out or clutch-coupling equally as well as though it were used in combination with a belt-driven pulley. Fig. 7 shows my device arranged as a clutch-coupling. In such case the shaft $s$ is divided, the end portion of one part having the driving-head $a$ secured thereon and the adjacent end portion $s^4$ of the other shaft having the coupling-head $p^4$ secured to it. This portion $p^4$ of the clutch-coupling is practically the equivalent of the pulley $p$, before described. In fact, the said head is sometimes enlarged and provided with a rim adapted to receive a belt, thus serving as a combined pulley and coupling, as indicated by dotted lines. In thus producing a clutch-coupling the head $p^4$ is secured to the shaft and is adapted to serve as a bearing for the end of the adjacent shaft, as shown in said Fig. 7.

I do not limit myself to the manner of operating the shipper-sleeve $c$, as shown and described, as it is obvious that other equivalent means or devices may be employed for the purpose without departing from the spirit of the invention.

I claim as my invention—

1. In a friction-clutch, the combination of a pulley or member provided with a surface adapted to receive a friction-ring, a driving-head having a recessed overhanging rim or flange provided with an adjusting-screw, a laterally-cut friction-ring interposed between said pulley-surface and flange and bearing against the adjusting-screw, a short shaft engaging the free end of the friction-ring and mounted to vibrate in said recess, an arm or lever secured to said shaft, a shipper-sleeve and means for operating the same, and a link or connection jointed to both the arm and shipper-sleeve, substantially as hereinbefore described.

2. In a friction-clutch, a loosely-mounted member or pulley, as $p$, provided with a surface adapted to be engaged by a friction-ring, a driving-head adapted to be secured to the main shaft, and a laterally-cut friction-ring mounted in and carried by said driving-head, in combination with an arm-carrying shaft $i$, mounted to vibrate in the driving-head and in engagement with one end of the friction-ring, a suitably-operated shipper-sleeve $c$, and a connection uniting the sleeve and the arm of the said shaft $i$, whereby any movement of the sleeve in either direction imparts an angular movement to the shaft $i$, substantially as hereinbefore described, and for the purpose set forth.

3. In a friction-clutch, the combination of a driving-head adapted to be secured to and revolve with the driving-shaft, a mounted shipper-sleeve, a friction-ring mounted and revolving in unison with said head, mechanism, substantially as described, connecting said sleeve and ring for contracting and expanding the latter, a pulley or member, as $p$, arranged to be frictionally clasped by the friction-ring, and a flanged bushing $b$, adapted to be loosely mounted upon the driving-shaft, having said pulley loosely mounted thereon and having the bearing-surfaces contiguous to the driving-shaft and pulley provided with spirally-arranged grooves filled with anti-friction metal, substantially as hereinbefore set forth.

4. In a friction-clutch, the combination, substantially as hereinbefore set forth, of a loosely-mounted member, a laterally-severed friction-ring $r$, adapted in use to engage said member, a head secured to the driving-shaft and adapted to receive said ring, a shipper-sleeve mounted to slide upon the driving-shaft, a longitudinally mounted and guided rod $i$, having its inner end portion in engagement with an end of the friction-ring, an arm or lever secured to the opposite end of said rod, a ball-jointed connection $l$, uniting said shipper-sleeve and lever, and mechanism for actuating the shipper, whereby upon moving the shipper along the shaft the rod $i$ is vibrated axially, thereby contracting the ring $r$ around the said loosely-mounted member and causing all the parts to revolve in unison.

In testimony whereof I have affixed my signature in presence of two witnesses.

ADELBERT H. HINKLEY.

Witnesses:
CHARLES HANNIGAN,
GEO. H. REMINGTON.